United States Patent [19]

Raufast

[11] Patent Number: 4,902,483
[45] Date of Patent: Feb. 20, 1990

[54] POLYMERIZATION IN SEVERAL STAGES OF ALPHA-OLEFINS IN THE GAS PHASE

[75] Inventor: Charles Raufast, Saint Julien Les Martigues, France

[73] Assignee: BP Chemicals Limited, London, United Kingdom

[21] Appl. No.: 69,244

[22] Filed: Jul. 2, 1987

Related U.S. Application Data

[62] Division of Ser. No. 828,966, Feb. 12, 1986, Pat. No. 4,703,094.

[30] Foreign Application Priority Data

Feb. 19, 1985 [FR] France ................. 85 02345

[51] Int. Cl.$^4$ .................. C08F 2/34; B01J 12/02
[52] U.S. Cl. .................. 422/134; 422/119; 422/132; 422/233; 422/235
[58] Field of Search .................. 422/131–135, 422/234, 235, 232, 233, 119, 7

[56] References Cited

U.S. PATENT DOCUMENTS

| | | | |
|---|---|---|---|
| 3,894,998 | 7/1975 | Spiegelman | 520/65 |
| 4,338,424 | 7/1982 | Morita et al. | 526/65 |
| 4,390,669 | 6/1983 | Morita et al. | 526/65 |
| 4,420,592 | 12/1983 | Kato et al. | 526/65 |

Primary Examiner—Michael S. Marcus
Attorney, Agent, or Firm—Brooks Haidt Haffner & Delahunty

[57] ABSTRACT

Apparatus for the production of polyolefins by the polymerization of alpha-olefins in the gas phase, in several stages, in at least two polymerization reactors interconnected by a transfer device making it possible to transfer the polyolefins resulting from the first reactor into the second reactor, in which the polymerization is continued under conditions identical to or different from those of the first reactor.

3 Claims, 3 Drawing Sheets

POLYMERIZATION IN SEVERAL STAGES OF ALPHA-OLEFINS IN THE GAS PHASE

This is a division, of application Ser. No. 828,966, filed Feb. 12, 1986 now U.S. Pat. No. 4,703,094.

The present invention relates to the production of polyolefins in several stages by polymerising alpha-olefins in the gas phase under low pressure, in at least two separate polymerisation reactors interconnected by a transfer device making it possible to transfer the polyolefins resulting from the first polymerisation reactor into the second reactor, in which polymerisation is continued under conditions identical to or different from those of the first reactor. The invention applies in particular to the polymerisation or copolymerisation of alpha-olefins having 2 to 12 carbon atoms, and more especially to the polymerisation or copolymerisation of ethylene and/or propylene, optionally in admixture with other alpha-olefins and/or with dienes.

According to the invention it is possible in particular to choose the desired polymerisation conditions in one of the reactors, regardless of the operating conditions of the other reactors. This process has the advantage in particular of making it possible to vary at will the composition of the polyolefins produced, and also their properties, such as distribution of molecular weights.

It is already known that alpha-olefins in the gas phase can be polymerised under low pressure, for example in a polymerisation reactor comprising a fluidised bed in which the solid polymer in course of formation is maintained in the fluidised state by means of a rising stream consisting of a reaction gas mixture comprising the alpha-olefins to be polymerised. The reaction gas mixture leaving the polymerisation reactor is generally cooled by means of a heat exchanger, before being recycled into the polymerisation reactor, after the addition of a quantity of alpha-olefins corresponding to the quantity consumed. Generally speaking the rate of fluidisation in the polymerisation reactor is sufficiently high to ensure homogenisation of the fluidised bed and dissipate effectively the heat given off by the polymerisation reaction. The polymerisation may be performed by means of a catalytic system of the Ziegler-Natta type, or by means of a catalyst comprising a chromium oxide compound associated by a granular support based on a refractory oxide and activated by thermal treatment, this catalyst system or this catalyst being introduced into the polymerisation reactor continuously or sequentially. The withdrawl of the polymer from the reactor may also be performed in a continuous or sequential manner.

It is also known that alpha-olefins can be polymerised in the gas phase in two or more separate polymerisation reactors connected successively to each other by transfer lines for the polyolefin powders from the first to the last polymerisation reactor. This process comprises introducing into the first polymerisation reactor a reaction gas mixture comprising alpha-olefins, and a catalyst system or a catalyst, polymerising the alpha-olefins in the gas phase in the first polymerisation reactor, withdrawing from this first reactor the polymer powder accompanied by reaction gas mixture, and transferring it into the second polymerisation reactor by means of a transfer line. A reaction gas mixture comprising one or more alpha-olefins and which is identical to or different from that of the first reactor, is introduced into the second reactor wherein polymerisation in the gas phase is continued. These various operations are continued in a similar manner up to and including polymerisation in the final reactor. This process also comprises the possibility of introducing into at least one polymerisation reactor other than the first one, an activation agent such as an organo-metallic compound of a metal of Groups I to III of the Periodic Table of Elements. Such a process has the advantage of increasing the overall polymerisation yield in relation to the catalyst system or the catalyst employed and to balance the reaction in the various polymerisation reactors. However, during its transfer from one polymerisation reactor to another, the polymer powder is accompanied by a quantity of reaction gas mixture from the first reactor, which in the absence of a cooling device may encourage the continuance of polymerisation during this transfer. This can lead to the formation of polymers of an undesirable quality and may involve risks of clogging the transfer line. Another problem observed when using this process originates from the fact that the quantity of reaction gas mixture accompanying the polymer powder withdrawn from the first polymerisation reactor can be sufficient to prevent the obtaining of the desired composition of the reaction gas mixture in the second reactor, particularly when gas composition or the polymerisation conditions in the latter are substantially different from those of the first polymerisation reactor.

Now it is especially interesting to be able to produce polylefins by polymerisation in several stages, by modifying in each stage the polymerisation conditions such as temperature, nature of the alpha-olefins, proportion of these alpha-olefins or of the hydrogen employed in the reaction gas mixture, or by modifying the composition or the concentration of one or more of the ingredients of the catalystic polymerisation system. However, it is important that the polymerisation conditions in each stage should be sufficiently independent of each other to facilitate regulation of the composition and/or properties of the final polymer product.

A process has already been proposed for polymerisation of alpha-olefins in the gas phase under low pressure in several stages, in at least two separate polymerisation reactors, interconnected by a device for transferring the polymer powder produced in the first polymerisation reactor to the second reactor. The transfer is carried out by placing the polymer powder produced in the first reactor in suspension in a readily volatile liquid hydrocarbon which is preferably non-polymerisable. This polymer suspension is then introduced direct into the second polymerisation reactor. Such a process, however, must comprise a special device for separating the readily volatile liquid hydrocarbon from the gas mixture leaving the second polymerisation reactor, having regard to the large quantities of this liquid hydrocarbon employed. Moreover, this process renders it difficult or impossible to achieve polymerisation conditions sufficiently different and independent as between the various polymerisation reactors, particularly when the alpha-olefins present in the reaction gas mixture in the first polymerisation reactor are readily condensible and are relatively soluble in the liquid hydrocarbon.

It has also been proposed that the reaction gas mixture accompanying the polymer powder withdrawn from a first polymerisation reactor should be diluted by means of a gaseous alpha-olefin before its transfer into a second polymerisation reactor. However, the operation of dilution by means of a gaseous alpha-olefin excludes any polymerisation process in which the amount of this alpha-olefin in the reaction gas mixture is lower in the second polymerisation reactor than in the first. Moreover, this dilution operation, which increases the content of alpha-olefin in the reaction gas mixture accompanying the polymer powder transferred, has the effect of promoting an undesirable continuance of the polymerisation reaction during the transfer of this polymer powder, and may lead to the production of polymer of an uncontrolled quality and possibly to the formation of polymer agglomerates, by reason of the absence of a cooling device in this transfer device.

It has also been proposed that the polymer powder withdrawn from a first polymerisation reactor and accompanied by reaction gas mixture should be brought into contact, prior to its transfer to a second polymerisation reactor, with an inert gas, chosen in particular from amongst nitrogen or saturated hydrocarbon gases comprising 1 to 5 carbon atoms, in order to replace at least a part of the ingredients of the reaction gas mixture by this inert gas. The inert gas content in the gas mixture thus obtained, accompanying the polymer powder, may in particular exceed 80%, and more generally 90% by volume. Therefore, the reaction gas mixture of the second polymerisation reactor is enriched in inert gas. However, in order to ensure an adequate speed of polymerisation in the second polymerisation reactor, it is necessary to introduce a considerable additional quantity of alpha-olefins into this second reactor. This may involve a substantial increase in the size of the second polymerisation reactor or a relatively large increase in the total pressure of the reaction gas in this reactor.

The present invention therefore relates to a process and an apparatus for polymerisation in the gas phase of alpha-olefins under low pressure in several successive stages in at least two separate polymerisation reactors interconnected by a transfer device, the polymerisation conditions in the various reactors being more or less independent of each other. This process facilitates the production of polymers or copolymers of alpha-olefins by low pressure gas phase polymerisation with yields which are particularly high both in relation to the catalyst system or the catalyst employed, and in relation to the alpha-olefins employed, it being possible for these polymers or copolymers to be of very diverse compositions and to preserve extremely varied properties. The terms "polymers" and "prepolymers" designate without restriction homopolymers of alpha-olefins comprising from 2 to 12 carbon atoms, statistical or block copolymers of two of these alpha-olefins, statistical or block terpolymers of three of these alpha-olefins and complex polymers prepared with 2 or more of these alpha-olefins and dienes which may be conjugated or not conjugated.

Accordingly, the present invention comprises a process for polymerisation of alpha-olefins in the gas phase under low pressure in successive stages, in at least two separate polymerisation reactors inter-connected by a transfer device, the process comprising introducing into a first gas phase polymerisation reactor, on the one hand, a reaction gas mixture comprising one or more alpha-olefins, and on the other hand a catalyst system or a catalyst, polymerising the alpha-olefin or alpha-olefins in the gas phase in the first polymerisation reactor, withdrawing from this first reactor the resultant polyolefin powder accompanied by reaction gas mixture, and transferring said powder by means of the transfer device into a second gas phase polymerisation reactor, introducing into this second reactor a reaction gas mixture comprising one or more alpha-olefins and which mixture is identical to or different from that of the first reactor, and optionally an additional quantity of the catalyst or of one or more ingredients of the catalyst system, and polymerising the alpha-olefin or alpha-olefins in the gas phase in the second polymerisation reactor, and when more than two reactor are used, repeating the operations of withdrawal from the second reactor and of transfer of the powder to a third reactor, and so on up to the last reactor, this process being characterised in that the polyolefin powder accompanied by reaction gas mixture withdrawn from a polymerisation reactor, is subjected, prior to being transferred into the following polymerisation reactor:

(a) firstly, to a decompression stage comprising lowering the pressure of this gas mixture to a pressure from 1/50 to 1/5 of the pressure existing in the polymerisation reactor from which the powder is withdrawn, and separating the polyolefin powder from the major part of the decompressed gaseous mixture, (b) then, to a compression stage comprising raising the pressure of the polyolefin powder and the residual gas mixture to the pressure of the following polymerisation reactor by means of the reaction gas mixture of this polymerisation reactor, this reaction gas mixture being employed at a temperature which is 20° C. or more lower than that of this polymerisation reactor.

According to the invention, the polyolefin powder accompanied by the reaction gas mixture, withdrawn from a polymerisation reactor hereinafter referred to as the "up-stream" reactor, is subjected first of all to a decompression stage consisting in lowering the pressure of this gas mixture to a pressure from 1/50 to 1/5, preferably from 1/30 to 1/10 of the pressure existing in the upstream polymerisation reactor. This decompression stage makes it possible in the first place to avoid an excessive continuance of the polymerisation during this stage, which would be liable to involve the formation of polyolefin powder of an undesirable quality, and also the formation of polyolefin agglomerates, which might form owing to the difficulty of eliminating the heat of reaction. The decompression stage also makes it possible to degas effectively the polyolefin powder withdrawn from the upstream polymerisation reactor, and to reduce appreciably the quantity of reaction gas mixture coming from this reactor and accompanying this powder into the following polymerisation reactor, hereinafter referred to as the "downstream" reactor. This means that the composition of the reaction gas mixture of the downstream polymerisation reactor is not substantially affected by that of the upstream reactor; consequently it can be controlled more easily and may be very different from that of the upstream reactor, and this contributing in particular to rendering the two polymerisation reactors practically independent of each other in their use.

A lowering of the pressure to a fraction greater than one fifth of the pressure existing in the upstream polymerisation reactor, increases the risk of forming polyolefin powder of an undesirable quality, the risk of forming agglomerates and renders the polymerisation conditions in the downstream polymerisation reactor more dependent on those of the upstream reactor; this would impair the quality of the polyolefin and reduce the number of grades of the polyolefins capable of being produced. On the other hand, too great a drop in the pressure during the decompression stage would require a larger installation for recompressing the reaction gas mixture especially when the said mixture is recycled into the upstream reactor. In practice however, the pressure in the decompression stage is generally not lowered below atmospheric pressure.

Moreover, the period for performing the decompression stage is chosen to be as short as possible; it is generally less than or equal to 60 seconds and preferably less than or equal to 30 seconds, in order to avoid any excessive continuance of polymerisation during this period.

The decompression stage may also be performed by various known techniques. For example, polyolefin powder may be withdrawn from the upstream reactor accompanied by reaction gas mixture from this reactor by means of a discharge device comprising a vessel provided with two valves alternatively opened and closed, and then the powder may be transferred into a decompression chamber of a volume equal to or greater than that of the discharge vessel. This device makes it possible to isolate a given quantity of polyolefin powder coming from the upstream polymerisation reactor. The volume of the discharge vessel is generally from 1/5000 to 1/100, preferably from 1/3000 to 1/300 of the volume occupied by the polyolefin powder in the upstream reactor. In order to withdraw regularly a given quantity of polyolefin powder, it is also desirable that the ratio between the pressure of the upstream polymerisation reactor and that existing in the discharge vessel before the latter is placed in communication with the reactor, should be equal to or greater than 5. In this case a given quantity of polyolefin powder may be withdrawn and isolated first of all by opening rapidly a valve placing the discharge vessel in communication with the polymerisation reactor, the outlet valve from this vessel then being closed, and the pressure in this vessel being less than that of the upstream polymerisation reactor; the pressure in this vessel rapidly rises until it attains that of the upstream polymerisation reactor; the valve on the discharge vessel communicating with the reactor is then closed and the outlet valve placing the discharge vessel in communication with a decompression chamber is rapidly opened. Generally it is preferred that the volume of the decompression chamber should be approximately twice, preferably 5 times the volume of the discharge vessel, so as to facilitate degassing and decompression operations of the polyolefin powder withdrawn from the upstream polymerisation reactor.

With a view to improving the efficiency of the process according to the invention it is preferable to recycle into the upstream polymerisation reactor, after the decompression stage, at least a part of the reaction gas mixture which is degassed in the decompression chamber.

After the decompression stage, the polyolefin powder is subjected to a compression stage by means of reaction gas mixture from the downstream polymerisation reactor. This compression stage makes it possible to raise the pressure to that existing in the downstream polymerisation reactor in the shortest possible period, generally less than or equal to 60 seconds, preferably less than or equal to 30 seconds. The reaction gas mixture of the downstream polymerisation reactor is employed in the compression stage at a temperature lower by 20° C. or more and preferably by 30° C. or more than that of the downstream polymerisation reactor, in order to avoid excessive polymerisation during this compression stage and during the transfer of the polyolefin powder into the downstream polymerisation reactor.

In practice, in the compression stage a part of the downstream polymerisation reactor gas may be used, after elimination of the heat of reaction produced in this polymerisation reactor and compression of the gas mixture. In this particular case, the reaction gas mixture may be at a temperature which is preferably at least 30° C. and more preferably at least 40° C. below the temperature of the downstream polymerisation reactor.

According to the invention the decompression and compression stages may be performed in the same chamber. However, it is preferred to perform the compression stage in a chamber specially designed for this purpose and distinct from the decompression chamber. The volume of the compression chamber is preferably less than or equal to 1.5 times the volume of the discharge vessel, in order to reduce as much as possible the volume of the reaction gas mixture accompanying the polyolefin powder coming from the decompression chamber.

In practice, the polyolefin powder may be transferred from the decompression chamber into the compression chamber, for example, by gravity, generally under relatively low pressure, preferably close to atmospheric pressure. This transfer may be effected by opening a full-bore valve located between the compression chamber and the decompression chamber, for example after having balanced the pressures between the said chambers, or alternatively after having slightly decreased the pressure in the decompression chamber in relation to that of the compression chamber.

It is also possible to carry out the transfer of the polyolefin powder to the downstream reactor after the decompression stage by means of a metering device making it possible to isolate a quantity of polyolefin powder to be subjected to the compression stage. This metering device in particular makes it possible to isolate a quantity at most equal to and preferably less than that withdrawn in the discharge vessel, which makes it possible to perform the compression stage, then the transfer of this powder into the downstream polymerisation reactor as quickly as or more quickly than the duration of the discharge. The metering device may be chosen from amongst a wide variety of appliances. In particular it may be of the rotary type and comprise at least one cavity which is alternatively placed in communication with the decompression chamber and with the compression chamber. Preferably it should be as gas tight as possible.

The polyolefin powder, after being subjected to the compression stage, is then transferred rapidly into the downstream polymerisation reactor via a pipeline. This transfer is performed preferably by means of a gas stream consisting of a part of the reaction gas mixture from the downstream polymerisation reactor, such as in particular the one used in the compression stage; this mixture is preferably at a temperature lower by 20° C. or more and preferably lower by 30° C. or more than that of the downstream polymerisation reactor. In practice, one may use all known methods for transferring powder under pressure, both continuously and in sequence. For example, pneumatic conveying may be used at a speed, generally equal to or greater than 10 m/sec, in order to avoid any stagnation of the powder in the transfer line.

After the transfer of the polyolefin powder into the downstream polymerisation reactor and when the compression chamber is distinct from the decompression chamber, the compression chamber is degassed in order to enable it to take a fresh quantity of polyolefin powder coming from the decompression chamber. During this degassing, at least a part of the reaction gas mixture employed in the compression stage may be advantageously recycled into the downstream polymerisation reactor, which makes it possible to improve the efficiency of the process.

It is important that the total duration for performing the stages of compression and transfer of the polyolefin powder to the downstream polymerisation reactor should not be too long. This total duration is advantageously less than or equal to 180 seconds, preferably less than or equal to 120 seconds, in order to provide a satisfactory operation of the process according to the invention. Too long a duration, notably over 180 seconds, involves a risk of formation of polyolefin of a quality difficult to control, and also a risk of formation of agglomerates during this period, especially in the compression chamber and the transfer line.

When the upstream polymeristion reactor is operated continuously, the mean hourly discharge rate of the polyolefin powder from the upstream polymerisation reactor corresponds approximately to the mean hourly rate of throughput of this powder to the downstream polymerisation reactor, stable and normal production conditions being attained. Consequently, these rates should be carefully controlled. However, to give a certain amount of flexibility in operating the process, it is possible to dissociate to a certain extent the instantaneous discharge rate from the upstream reactor and the instantaneous rate of introduction of the polyolefin powder into the downstream reactor, in particular by means of an intermediate storage chamber which makes it possible to preserve the said polyolefin powder temporarily between the decompression and compression stages. The intermediate storage chamber is preferably located between the decompression chamber and the compression chamber. Its volume should be sufficient to provide flexibility in various operations of transfer of polyolefin powder between the upstream and downstream polymerisation reactors. In particular it may correspond to more than 30 times the volume of the discharge vessel. The polyolefin powder is maintained in this intermediate storage chamber under a pressure which is generally low, from 1/50 to 1/5 and preferably from 1/30 to 1/10 of the pressure existing in the upstream polymerisation reactor. This pressure may advantageously be close to atmospheric pressure. The atmosphere of this intermediate storage chamber may consist of the reaction gas mixture from the upstream polymerisation reactor, decompressed after the decompression stage, or by one or several constituents of reaction gas mixture for example hydrogen. In fact, it has been observed that when the polyolefin powder has been stored in the intermediate storage chamber under an atmosphere consisting largely of hydrogen, the total duration required to perform the compression stage and then the transfer of the polyolefin powder into the downstream polymerisation powder may be extended to 300 seconds without increasing the risks of formation of polyolefin powder of an undesirable quality, and without the risks of formation of agglomerates during this period.

The polyolefin powder can be maintained in an agitated state in the intermediate storage chamber by means of a mechanical stirrer device and/or by the passage of a rising stream of gas mixture through a fluidised bed of the polyolefin powder, and may optionally be cooled in order to avoid any localised heating of the polyolefin powder due to uncontrolled polymerisation in this chamber. The latter may be equipped in particular with a double jacket permitting the circulation of a cooling fluid.

The overall yield of the polymerisation reaction in relation to the catalyst system or catalyst may be notably increased in the process according to the invention by the addition to the polyolefin powder withdrawn from the upstream polymerisation reactor of an activating agent, such as an organometallic compound of a metal of Groups I to III of the Periodic Table of Elements. The addition of an activating agent is advantageously performed after the decompression stage and before the introduction of the polyolefin powder into to the downstream polymerisation reactor. It may for example be performed during the compression stage, especially in the compression chamber. However, it is preferable to carry out this addition between the stages of decompression and compression, especially in the intermediate storage chamber, when the storage device comprises one such chamber; the latter is preferably provided with means capable of homogeneously dispersing the activating agent in the polyolefin powder. It is also possible to carry out this addition during the transfer of the polyolefin powder into the downstream polymerisation reactor, in particular at any point in the pipe in which the polyolefin powder is transported, for example, pneumatically.

The process of the present invention may be utilised to advantage in the polymerisation of alpha-olefins using a Ziegler-Natta catalyst system comprising a catalyst based on a compound of a transition metal of Groups IV, V, or VI of the Periodic Table of Elements and optionally a magnesium compound, and a cocatalyst comprising an organometallic compound of a metal of Groups I to III of the Periodic Table. Catalyst systems of high activity in which the catalyst comprises magnesium and transition metal compounds are particularly useful in the process of the present invention. These catalysts may be obtained by a variety of techniques, especially by those in which a magnesium compound such as magnesium chloride is ground in the presence of at least one transition metal compound, or alternatively a solid magnesium compound is formed in the presence of one or more transition metal compounds. The catalyst systems of the Ziegler-Natta type may be employed directly in this form in the process of the present invention, or alternatively they may be previously supported on a granular inorganic support selected, for example, from refractory products, for example alumina, silica, aluminium silicate or magnesium silicate, or may be converted into prepolymer by contacting one or more alpha-olefins with the said catalytic systems.

Examples of catalytic systems of the Ziegler-Natta type which can be employed in the process of the present invention are described in French Pat. Nos. 2097571, 2099311, 2116698, 2134872, 2144080, 2185442, 2193654, 2217354, 2233337, 2340131, 2381565, 2529208 and 2529209.

The process of the present invention can also be used for polymerising alpha-olefins using a catalyst comprising an oxide of chromium associated with a granular refractory oxide support and activated by thermal treatment at a temperature of at least 250° C. and not higher than the temperature at which the support commences to sinter, that is to say at a temperature generally less than 1200° C., under a non-reducing, preferably an oxidising atmosphere. The chromium content of the catalyst is preferably between 0.05 and 30 weight %, most preferably between 0.1 and 3 weight %. The catalyst can comprise in addition to the chromium oxide, a titanium compound. Under these circumstances the titanium content in the catalyst can be, for example 0.1 to 20 weight %, preferably 0.5 to 8 weight %. The granular refractory oxide support can be, for example, silica, alumina, zirconia, thoria, titania, or mixtures of coprecipitates of two or more of these oxides. The thermal activation of the catalyst can be carried out, if desired, in the presence of fluorine-containing compounds, for example ammonium hexafluorotitanate, ammonium tetrafluoroborate or ammonium hexafluorosilicate, optionally in the presence of a titanium compound, for example a titanium alkoxide. Catalysts of this type which can suitably be employed in the process of the present invention are described, for example in U.S. Pat. Nos. 3879362, 4053436 and 4101722 and French Pat. Nos. 2134743 and 2269537.

Such catalysts can be employed directly in the process of the present invention or alternatively employed in the form of a prepolymer previously prepared by contacting the said catalyst with one or more alpha-olefins, optionally in the presence of an activating agent which can be, for example, an organometallic compound of a metal of Groups I to III of the Periodic Table of Elements.

In the process of the present invention, the gaseous reaction mixture employed in the two or more polymerisation reactors can be identical or different. It comprises at least one alpha-olefin having 2 to 12 carbon atoms, for example ethylene, propylene, butene-1, hexene-1, 4-methyl-pentene-1 or octene-1 and optionally 1 or more conjugated or non-conjugated dienes, for example butadiene, 1,4-hexadiene, 1,5-hexadiene, vinylnorbornene, ethylidene norbornene, dicyclopentadiene. Preferably the gaseous mixture comprises ethylene and/or propylene optionally mixed with one or more other alpha-olefins comprising 4 to 12 carbon atoms.

The gaseous reaction mixture can also include hydrogen chain transfer agent for modifying the average molecular weight of the produced polyolefins. The content of hydrogen in the gaseous reaction mixture can be the same or different in each of the polymerisation reactors.

The gaseous reaction mixture can also include an inert gas. The proportion of gas can be the same or different in each reactor. Examples of suitable inert gases are nitrogen, methane, ethane, propane, butane or a mixture of two or more of these gases. The use of an inert gas in the gaseous reaction mixture facilitates the removal of heat of polymerisation from the fluidised bed reactors.

The total pressure of the gaseous reaction mixture may be the same or different in each of the polymerisation reactors. Generally, pressures above atmospheric pressure are employed with the object of increasing the speed of polymerisation: the pressure can be for example 0.5 to 5 MPa and is preferably 1 to 3 MPa. The temperature is maintained in each reactor at a value appropriate to obtaining the desired speed of polymerisation but below the temperature at which substantial softening of the polyolefin product occurs. It may therefore be identical or different in the various polymerisation reactors and is generally chosen from 30° to 115° C., preferably from 50° to 100° C.

The mean residence period of the polyolefins being formed in each polymerisation reactor may vary within fairly wide limits, in practice going from 5 minutes to 10 hours. This mean residence time depends largely on the temperature prevailing in the polymerisation reactor under consideration and also on the rate of introduction of the alpha-olefins and possibly of the dienes to be polymerised.

The polymerisation reactors may be chosen from amongst apparatus of a known type, such as fluidised-bed reactors, reactors with a bed stirred by a mechanical stirrer, or from amongst reactors with a bed which is both fluidised and stirred.

The number of polymerisation reactors arranged in series is preferably limited to two or to three, as it has been found that it is generally possible to obtain satisfactory operation of the process with such a number of polymerisation reactors. It is also possible to place several polymerisation reactors in parallel, fed by a single polymerisation reactor situated upstream. Thus for example the first polymerisation reactor located upstream may be equipped so as to feed several secondary polymerisation reactors located downstream.

The process of the invention is preferably performed continuously so that the operating conditions of each of the polymerisation reactors are more or less constant. This mode of performance may be obtained in practice by circulating a reaction gas mixture with substantially constant characteristics in each polymerisation reactor, and consisting, for the major part, of the recycled reaction gas mixture coming from the same polymerisation reactor.

The operating conditions of the various polymerisation reactors are sufficiently independent of each other for it to be possible to operate each of these reactors under conditions different from those of the others, particularly as regards the composition of the catalyst system, the temperature, the mean residence time of the polymer and the total pressure.

The process of the invention has several advantages for the industrial-scale production of polyolefins. It permits stable operation of the polymerisation reactors, without the formation of polyolefin powder of an undesirable quality and/or agglomerate liable to involve setting of the polyolefins, especially in the devices for transfer from one polymerisation reactor to another. Suprisingly it has been found that the process of the invention could be performed continuously and in a stable manner, especially when the compression stage of the polyolefin powder and the transfer stage of this powder to the downstream polymerisation reactor are performed by means of the reaction gas mixture from the downstream polymerisation reactor. It might be feared, in fact, in this case that during these stages polymer powder or agglomerate might be formed under conditions which could not be controlled due to the impossibility of effective elimination of the heat of polymerisation. The apparatus according to the invention may also be operated under very varied conditions, for it is possible to adjust at will the operating conditions of each polymerisation reactor of the installation, and in this way to get the best out of each type of catalyst or catalyst system used. The process of the invention also has advantages on the level of quality of the polyolefins obtained, the properties of which may be varied within wide limits by modifing, for example, the nature of the alpha-olefins employed and/or the mean molecular weight of the polyolefins in each polymerisation reactor. Furthermore this process leads to the production of polyolefins in the form of a powder, consisting of particles of fairly homogeneous dimensions, and this powder can be used direct by converters.

In this way according to the process of the invention one may produce homopolymers of ethylene or propylene with high yield in relation to the catalyst or catalyst system, it being possible for these homopolymers to have a molecular weight distribution which is variable at will within a wide range. One may produce with high yields statistical copolymers of ethylene and one or more alpha-olefins having 3 to 12 carbon atoms, copolymers with a density comprised between 0.89 and 0.95 and with a molecular weight distribution adjustable at will in a wide range. One may also produce under distinctly improved conditions block copolymers such as copolymers of propylene, ethylene and/or another alpha-olefin having 4 to 12 carbon atoms, and copolymers of the elastomer type such as copolymers of ethylene, propylene and optionally a diene.

The invention is illustrated below by means of FIGS. 1, 2 and 3. These are simplified diagrams representing embodiments of the invention, comprising two fluidised-bed reactors, connected to each other by a special transfer device.

Figure 1:
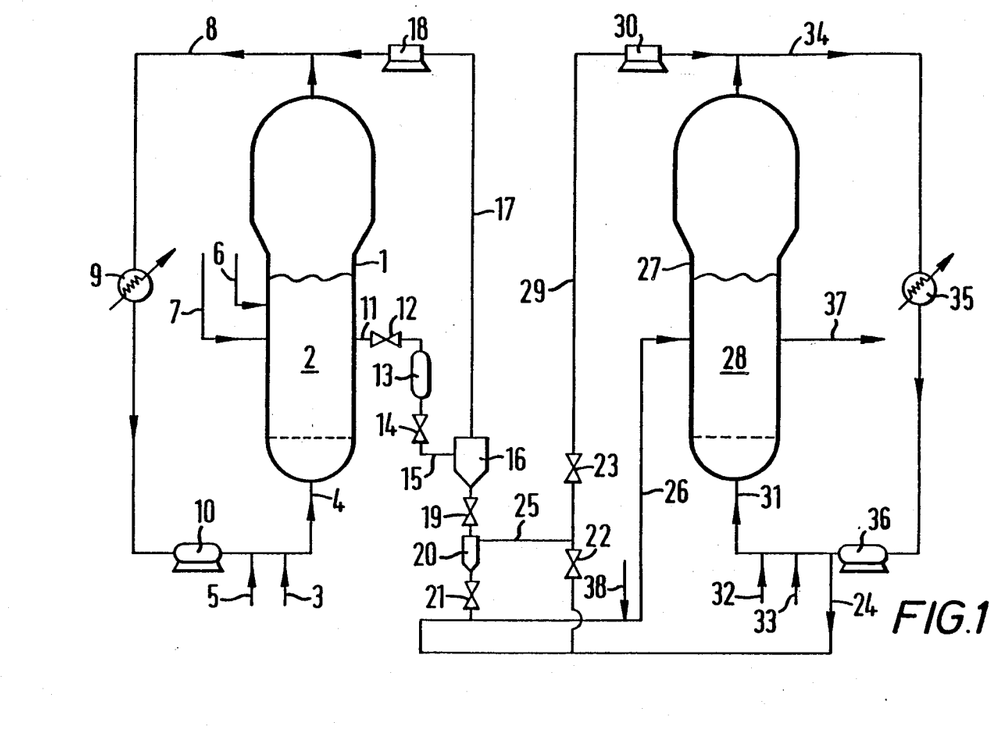

The apparatus represented by FIG. 1 comprises a first fluidised-bed polymerisation reactor (1), comprising at (2) the polyolefin powder being formed. The alpha-olefin or alpha-olefins to be polymerised are introduced into the reactor (1) by pipeline (3) and (4); a gas such as hydrogen and/or inert gas such as nitrogen may be introduced via the line (5). The reactor (1) is fed with catalyst or catalyst system by means of the pipe (6) and optionally with cocatalyst or activation agent by means of the pipe (7). The reaction gas mixture leaving the reactor (1) via the pipe (8) is cooled in heat exchanger (9) before being compressed in the compressor (10) and recycled into the reactor (1) via the pipe (4). A part of the polyolefin present in the reactor (1) leaves this reactor accompanied by reaction gas mixture, via the pipe (11); this pipe (11) provided with a valve (12) is connected with discharge vessel (13). The polyolefin powder, isolated in the discharge vessel (13) is then transferred via the outlet valve (14) and a pipe (15) into a decompression chamber (16). A part of the reaction gas mixture decompressed in decompression chamber (16) may be recycled by means of a pipe (17) and a compressor (18) in the pipe (8) of the reactor (1). The polyolefin powder is then transferred via a full-bore valve (19) in the compression chamber (20) equipped with valves (21) and (22) which are closed and the valve (23) which is open. The valve (19) is then closed. The polyolefin powder collected in the compression chamber (20) is placed under pressure by means of the reaction gas mixture coming from the second polymerisation reactor via the pipe (24) and (25), by opening the valve (22), the valve (23) being closed. The polyolefin powder thus placed under pressure is then conveyed pneumatically, after the opening of the valve (21) via the transfer line (26) into the fluidised-bed reactor (27) containing at (28) the polymer powder; the pipe (26) is fed by a gas stream consisting of the reaction gas mixture coming from the second polymerisation reactor (27) via the pipe (24). A pipe (38) making it possible to introduce an activating agent leads into the transition line (26). After pneumatic conveyance of the polyolefin powder as far as the reactor (27), the valves (21) and (22) are closed and the compression chamber (20) is degassed by opening the valve (23); the gas leaving the compression chamber (20) may be recycled into the second polymerisation reactor (27) via the pipe (29) and the compressor (30). The reactor (27) contains at (28) the polyolefin powder being formed which is maintained in the fluidised state by means of a gas stream introduced in the reactor (27) via the pipe (31). The alpha-olefin or alpha-olefins to be polymerised are introduced into the pipe (31) via the pipe (32); a gas such as hydrogen and/or an inert gas such as nitrogen may be introduced via the pipe (33). The reaction gas mixture leaving the reactor (27) via the pipe (34) is cooled in a heat exchanger (35), before being compressed in the compressor (36) and recycled to the reactor (27) via the pipe (31). The polyolefin powder present in the reactor (27) leaves the latter via the pipe (37) which is connected to the outside by means of a withdrawal device (not shown). All the operations of withdrawal, decompression, compression, transfer and introduction of the polyolefin powder into the reactor (27) are performed periodically, which makes it possible to provide regular operation of the installation.

Figure 2:
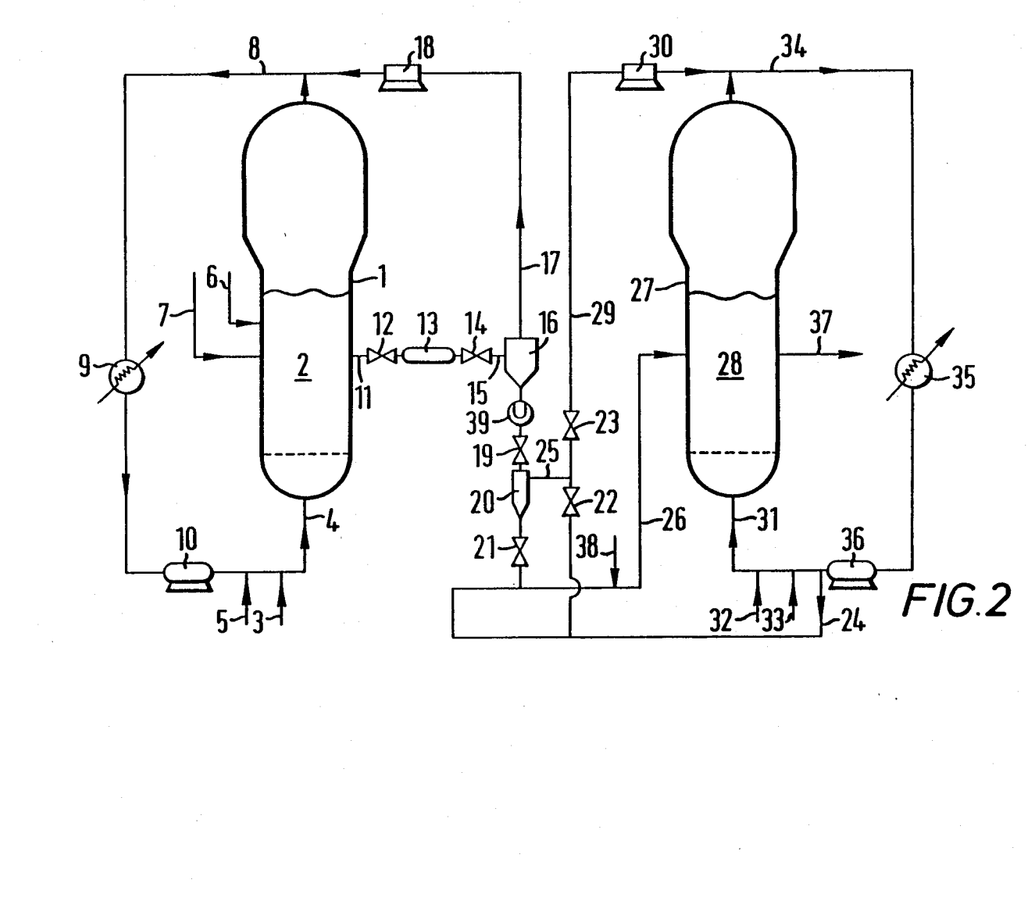

FIG. 2 shows in diagram form a polymerisation installation similar to that of FIG. 1, comprising in addition a metering device (39), communicating alternately with the decompression chamber (16) and the compression chamber (20); this metering device (39) comprises a cavity making it possible to withdraw a given quantity of polyolefin powder from the decompression chamber (16) and deliver it to the compression chamber (20) via a full-bore valve (19).

Figure 3:
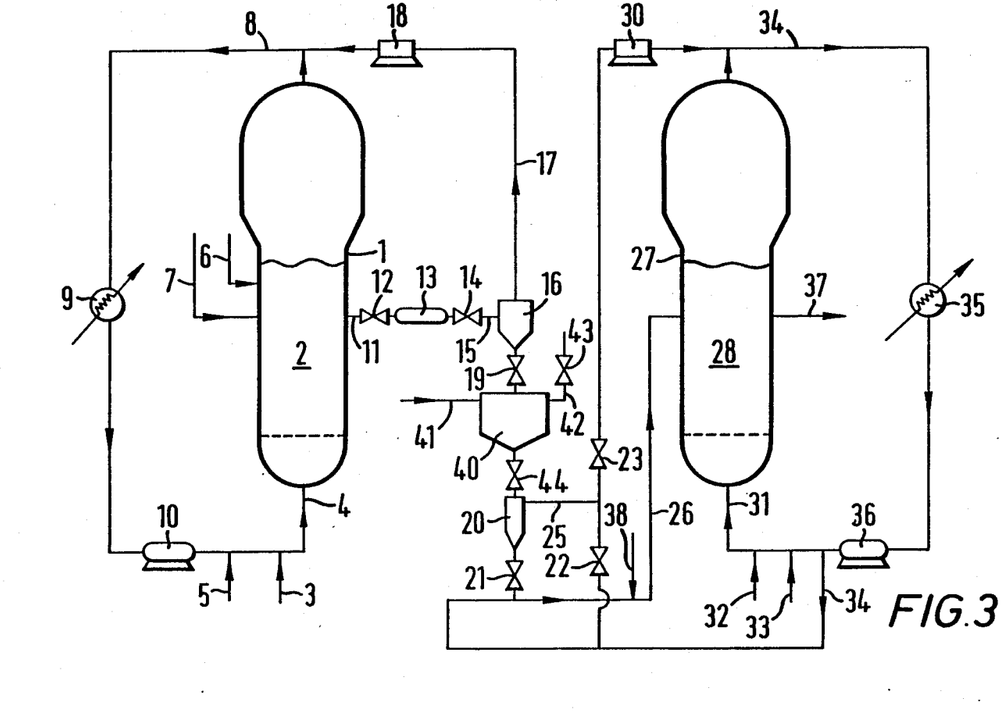

FIG. 3 shows in diagram form polymerisation apparatus similar to that of FIG. 1, comprising in addition an intermediate storage chamber (40) making it possible to take the polyolefin powder from the decompression chamber (16) via the full-bore valve (19). The intermediate storage chamber (40) is provided with a feed pipe (41) for a gas such as hydrogen and a vent pipe (42) comprising of valve (43) which is connected to the compression chamber (20) by a full-bore valve (44).

The invention also relates to an apparatus which can be applied to the production of polyolefin powder by polymerisation or copolymerisation of alpha-olefins in the gas phase, such as shown by FIG. 1 comprising two or more reactors such as (1) and (27) for polymerisation or copolymerisation of alpha-olefins, these reactors being arranged in series in the direction of circulation of the polyolefin powder, each of these reactors being provided with means for feeding-in alpha-olefins and with cooling means, the first of these reactors, in the direction of circulation of the polyolefin powder, being provided with means for introducing catalyst compounds, and the last these reactors in the direction of circulation of the polyolefin powder, being provided with means for withdrawal to the outside of the polyolefin powder, each of these reactors except the last, in the direction of circulation of the polyolefin powder being connected to the following reactor by means of a transfer device for the polyolefin powder, the apparatus being characterised in that the transfer device between successive reactors comprises, in the direction of circulation of polyolefin powder:

a powder discharge device comprising a vessel (13) connected to the reactor (1) via a pipe provided with a valve (12) and connected to a decompression chamber (16) by a pipe provided with a valve (14), a decompression chamber (16), connected to the discharge device and to a compression chamber (20) via a pipe provided with a valve (19), a compression chamber (20), connected (a) to the decompression chamber (16), (b) to the feed circuit for gas mixture from the reactor (27) via the pipe (24), the valve (22) and the pipe (25), (c) to the reactor (27) via the valve (21) and a transfer for powder (26) and (d) optionally to the reactor (27) via a pipe provided with a valve (23) and a compressor (30).

According to another embodiment the apparatus of the invention may also comprise, according to the diagram shown in FIG. 2, a metering device (39) arranged between the decompression chamber (15) and the valve (19) communicating with the compression chamber (20). This metering device, for example, may consist of a rotary device provided with a cavity which is alternately placed in communication with the decompression chamber (15) and with the compression chamber (20) via the valve (19).

According to another variant, the apparatus of the invention may also comprise, according to the diagram shown in FIG. 3, an intermediate storage chamber (40) arranged between the valve (19) and the compression chamber (20). This intermediate storage chamber is connected to the compression chamber (20) by a pipe provided with a valve (44); this chamber (40) is equipped with a feed pipe (41) for gas and a pipe (42) provided with a valve (43) making it possible to degas the chamber (44).

EXAMPLE 1

A copolymer of ethylene and 1-butene is prepared by means of apparatus comprising two fluidised-bed reactors (1) and (27), connected to each other by a transfer device shown diagramatically in FIG. 2.

The reactor (1) comprises a bottom part (2) of cylindrical form, with a vertical axis and 0.45 meter in diameter, containing a fluidised bed of polyolefin of 900 dm$^2$. A rising gas stream circulates inside the reactor (1) at a speed of 35 cm/sec, under a constant pressure of 2.0 MPa, at 70° C. at the reactor inlet. This gas stream consists of a reaction gas mixture comprising 27.5% by volume of ethylene, 1.5% by volume of hydrogen and 71% by volume of nitrogen.

The reactor (1) is fed by the pipe (6) with a catalyst system consisting of a prepolymer powder prepared previously. This prepolymer is obtained by bringing into contact ethylene and a catalytic system consisting of a catalyst prepared according to Example 1 of French Pat. No. 2405961, and a co-catalyst. The catalyst contains per gram atom of total titanium, 0.92 gram atom of trivalent titanium, 0.08 gram atom of tetravalent titanium, 3.8 gram atoms of magnesium, 8.6 gram atoms of chlorine and 2 gram equivalents of a propylate group. The co-catalyst consists of tri-n-octylaluminium (TnOA) used in a quantity such that the ratio of the number of gram atoms of aluminium to the number of gram atoms of total titanium is equal to 0.8, and ethylene in a quantity such that the prepolymer contains $2.5\times10^{-2}$ milligramme atoms of total titanium per gram. This prepolymer has a bulk density equal to 0.3 g/cm$^3$, a density of 0.96 and a melt index (MI$_{2.16}$) measured at 190° C. under a 2.16 kg load equal to 1 g/10 minutes; it consists of particles having a mean diameter by mass of 200 microns. This prepolymer powder is introduced into the reactor (1) at a rate of 600 g/h. The mean residence time of polyethylene in formation in the polymerisation reactor (1) is 4½ hours. The polyethylene powder collected at the outlet from this reactor has the following characteristics:

a density of (20° C.) of 0.96,
a content by weight of titanium of 51 ppm,
a melt index (MI$_{2.16}$) measured at 190° C. under a 21.6 kg load equal to 0.3 g/10 minutes,
an average molecular weight determined by viscometry of 400,000
a bulk density of 0.35 g/cm$^3$,
a mean diameter by mass of the particles of 600 microns.

This polyethylene powder is discharged from the reactor (1) via the pipe (11) at a mean hourly output of 15 kg/h. This withdrawal is carried out in sequences, by opening the valve (12) in order to place the reactor (1) in communication via the pipe (11) with the discharge vessel (13) having a volume of 12 dm$^3$, with its outlet valve (14) closed, this discharge vessel being under a pressure of 0.15 MPa before the valve (12) is opened. The discharge vessel (13) is then filled with polyethylene powder and reaction gas mixture until there is obtained in this vessel a pressure equivalent to that in the polymerisation reactor (1). The valve (12) is closed and the outlet valve (14) is opened so as to place the discharge vessel (13) in communication via the pipe (15) with the decompression chamber (16) having a volume of 130 dm$^3$; this chamber is initially under a pressure of 0.15 MPa. The total time for carrying out the filling of this discharge vessel (13) and transfer of the polyethylene powder to the decompression chamber (16) is approximately 13 seconds.

The metering device (39) of the rotary type, comprising a cavity of 1.2 dm$^3$ capacity, is placed in communication first with the decompression chamber (16) in order to fill the said cavity with polyethylene powder; it is then placed in communication with the compression chamber (20) having a volume of 3.4 dm$^3$, the full-bore valve (19) being opened in order to empty the polyethylene powder from the cavity into the compression chamber (20), the valves (21) and (22) being closed and the valve (23) being opened, so as to maintain a pressure of 0.13 MPa in the said compression chamber (20). The polyethylene powder collected in the compression chamber (20) is placed under a pressure of 2.0 MPa by closing the valve (23) and the full-bore valve (19), then opening the valve (22), this pressurising being effected in approximately 6 seconds. This pressurising is carried out by means of the reactor gas mixture coming from the reactor (27), this gas mixture being cooled to 40° C. After the opening of the valve (21) the polyethylene powder is conveyed pneumatically into the reactor (27) via the transfer pipe (26) in which there is circulating the reaction gas mixture coming from the reactor (27) via the pipes (34) and (24) and cooled to the temperature of 40° C. There is added to the polyethylene powder pneumatically conveyed in the transfer pipe (26) a molar solution tri-n-octylaluminium (TnOA) in n-hexane introduced at a throughput of 200 ml/h via the feed pipe (38). At the end of this pneumatic conveyence, the valves (21) and (22) are closed, then the valve (23) is opened to degas the compression chamber (20) to a pressure of 0.13 MPa, the reaction gas mixture being recycled via the pipe (29) and the compressor (30) into the pipe (34). The frequency of operation of the metering device (39) is such that the mean hourly throughput of polyethylene powder transferred from the decompression chamber (16) into the compression chamber (20) is 15 kg/h. The total period for pressurising the polyethylene powder in the compression chamber (20) and its transfer into the reactor (27) is approximately 100 seconds for each quantity delivered by the metering device (39).

The polyethylene powder is introduced via the transfer pipe (26) into the reactor (27) at mean hourly throughput of 15 kg/h. The reactor (27), identical in form to that of the reactor (1) possesses a cylindrical lower part with a diameter equal to 0.87 meter; at (28) it contains ethylene copolymer powder in the form of a fluidised bed of 1,200 dm$^3$ by volume. A rising gas stream circulates in the reactor (27) at speed of 45 m/sec under a pressure of 2.0 MPa and at a temperature of 85° C. This gas stream consists of a reaction gas mixture comprising 40% by volume of ethylene, 3% by volume 1-butene, 16% by volume hydrogen and 4.1% by volume of nitrogen.

The mean residence time of the ethylene copolymer in formation in the fluidised bed (28) is 3.3 hours. The powder of the copolymer of ethylene and 1-butene is withdrawn regularly from this bed via the pipe (37) at mean hourly throughput of approximately 100 kg/h; it has the following characteristics;

a density (at 20° C.) of 0.953, a content by weight of titanium at 6 ppm, a melt index ($MI_{8.5}$), measured at 190° C., under a load of 8.5 kg equal to 1.2 g/10 minutes, a flow parameter calculated according to the equation;

log ($MI_{21.6}/MI_{8.5}$)/log(21.6/8.5) equal to 2.0, a bulk density of 0.37 g/cm$^3$, a mean diameter by mass of the particles of 1,000 microns a molecular weight distribution of 11.0. This measurement is carried out by gel permeation chromatography (GPC); it is equal to the ratio of the weight average molecular weight, Mw, to the number average molecular weight, Mn.

It is found that after more than 48 hours of continuous operation, this installation produces regularly and satisfactorily a copolymer powder of ethylene and 1-butene of a perfectly controlled quality.

EXAMPLE 2

Ethylene polymerisation is carried out by means of the apparatus described in Example 1.

The rising gas stream circulates inside the reactor (1) at speed of 35 cm/sec, under a constant pressure of 2.16 MPa at 92° C. This gas stream consists of a reaction gas mixture comprising 37% by volume of ethylene, 30% by volume of hydrogen and 33% by volume of nitrogen.

The reactor (1) is fed with a catalyst system consisting of a prepolymer powder identical to that of Example 1, except for the fact that the ratio of the number gram atoms of aluminium to the number of gram atoms of total titanium is equal to 1.5 instead of 0.8. The polyethylene powder obtained in the polymerisation reactor (1) has the following characteristics;

a density (at 20° C.) of 0.96, a content by weight of titanium of 34 ppm, a melt index ($MI_{2.16}$) of 6 g/10 minutes, a bulk density of 0.36 g/cm$^3$ a mean diameter by mass of the particles of 670 microns.

This polyethylene powder is withdrawn from the polymerisation reactor (1) and is transferred to the reactor (27) as Example 1, except for the fact that the polyethylene powder collected in the compression chamber (20) is placed under a pressure of 2.16 MPa instead of 2.0 MPa and that there is added to the polyethylene powder conveyed pneumatically into the transfer pipe (26) a molar solution of TnOA in n-hexane at a throughput of 50 ml/h instead of 200 ml/h.

This polyethylene powder is introduced into the reactor (27) in which there is circulating a rising gas stream at a speed of 45 cm/sec under a pressure of 2.16 MPa, at temperature of 92° C. This gas stream consists of a reaction gas mixture comprising 55.5% by volume of ethylene and 44.5% by volume of hydrogen.

The polyethylene powder withdrawn from the polymerisation reactor (27) has the following characteristics:

a density (at 20° C.) of 0.960, a content by weight of titanium of 4 ppm, a melt index ($MI_{2.16}$) of 6 g/10 minutes, a flow parameter calculated according to the equation log ($MI_{21.6}/MI_{2.16}$) equal to 1.20, a bulk density of 0.38 g/cm$^3$, a mean diameter by mass of the particles of 110 microns, a molecular weight distribution of 4.

After 48 hours of operation it is found that this apparatus produces regularly and satisfactorily a polyethylene powder of perfectly controlled quality.

EXAMPLE 3

A copolymerisation of ethylene and 1-butene is carried out by means of the apparatus described in Example 1.

The rising gas stream circulates inside the reactor (1) at a speed of 45 cm/sec, under a constant pressure of 2.0 MPa at 80° C. This gas stream consists of a reaction gas mixture comprising 32% by volume of ethylene, 12% by volume of 1-butene, 1,5% by volume of hydrogen and 54.5% by volume of nitrogen.

The reactor (1) is fed with a catalyst system consisting of a prepolymer powder identical to that of Example 1, except for the fact that the ratio of the number of gram atoms to the number of gram atoms of total titanium is equal to 1.6 instead of 0.8. The powder of the copolymer of ethyene and 1-butene obtained in the polymerisation reactor (1) has the following characteristics:

a density (at 20° C.) of 0.915, a content by weight of titanium of 18 ppm, a content by weight of units derived from 1-butene of 7.5%, a melt index ($MI_{8.5}$) of 0.6 g/10 minutes, a bulk density of 0.32 g/cm$^3$ a mean diameter by mass of the particles of 830 microns.

This copolymer powder of ethylene and 1-butene is withdrawn from the polymerisation reactor (1) and transferred into the reactor (27) as described in Example 1, except for the fact that the mean hourly throughput of withdrawal and transfer from the reactor (1) of the powder is 25 kg/h instead of 15 kg/h.

This copolymer powder is introduced into the reactor (27) in which there is circulating a rising gas stream at a speed of 45 cm/sec under a pressure of 2.0 MPa, at a temperature of 80° C. This reaction gas stream comprises 40% by volume of ethylene, 15% by volume of 1-butene, 12% by volume of hydrogen and 33% by volume of nitrogen.

The copolymer powder of ethylene and 1-butene is withdrawn from the polymerisation (27) at a mean hourly throughput of approximately 90 kg/h and has the following characteristics:

a density (at 20° C.) of 0.918,
a content by weight of titanium of 5 ppm,
a content by weight of units derived from 1-butene of 7.5%,
a melt index ($MI_{2.16}$) of 1 g/10 minutes,
a flow parameter calculated according to the equation log ($MI_{2.16}/MI_{2.16}$) equal to 1.90,
a bulk density of 0.34 g/cm$^3$,
a molecular weight distribution of 7.5.

After 48 hours of operation it is found that this apparatus produces regularly and satisfactorily a copolymer powder of ethylene and 1-butene of a perfectly controlled quality.

I claim:

1. Apparatus for the gas phase polymerization of alpha-olefins comprising, at least first and second serially disposed reactors, each of said reactors having cooling means associated therewith and recycle means; said first reactor having catalyst inlet means, an olefin inlet means at a lower end thereof, an outlet means at an upper end thereof and said recycle means of said first reactor being connected to said inlet and outlet means of said first reactor; olefin feed means connected to said recycle means of said first reactor; said second reactor having an outlet at the upper end connected to said recycle means of said second reactor, said second reactor recycle means connected to said second reactor at bottom and side inlets thereof; powder transfer means connected to said first reactor means at a first end thereof; said powder transfer means comprising in seriatim, a first conduit section, a first valve means, a discharge vessel, a second valve means, a decompression means having an upper discharge connection connected to the recycle means of said first reactor and a lower discharge connection connected via a third valve to a compression chamber, said compression chamber having first and second outlet members, said first outlet member connected to and communicating with said recycle means of said second reactor; fourth and fifth valve means in said recycle means of said second reactor upstream and downstream of the point of connection of said first outlet member; and, said second outlet member connected and communicating directly with said side inlet.

2. The apparatus according to claim 1 wherein powder metering means is located between said decompression means and said third valve means.

3. The apparatus according claim 1 wherein a powder storage container is located between said third valve means and said compression chamber.

* * * * *

UNITED STATES PATENT AND TRADEMARK OFFICE
CERTIFICATE OF CORRECTION

PATENT NO. : 4,902,483

DATED : February 20, 1990

INVENTOR(S) : CHARLES RAUFAST

It is certified that error appears in the above-identified patent and that said Letters Patent is hereby corrected as shown below:

Col. 16, Example 3, line 35, "1,5%" should read --1.5%--.

Signed and Sealed this

Twenty-third Day of July, 1991

Attest:

HARRY F. MANBECK, JR.

Attesting Officer

Commissioner of Patents and Trademarks